US007100906B2

(12) United States Patent
Kucera

(10) Patent No.: US 7,100,906 B2
(45) Date of Patent: Sep. 5, 2006

(54) EVAPORATIVE COOLER WATER DISTRIBUTION SYSTEM

(75) Inventor: John G. Kucera, Mesa, AZ (US)

(73) Assignee: AdobeAir, Inc., Phoenix, AZ (US)

( * ) Notice: Subject to any disclaimer, the term of this patent is extended or adjusted under 35 U.S.C. 154(b) by 385 days.

(21) Appl. No.: 10/612,322

(22) Filed: Jul. 2, 2003

(65) Prior Publication Data
US 2005/0029371 A1 Feb. 10, 2005

(51) Int. Cl.
*B01F 3/04* (2006.01)
*B05B 1/14* (2006.01)

(52) U.S. Cl. .................. 261/97; 261/98; 261/106; 239/590.3; 239/593

(58) Field of Classification Search .............. 261/97, 261/98, 106, 107, 110, 111; 239/590, 590.3, 239/593
See application file for complete search history.

(56) References Cited

U.S. PATENT DOCUMENTS 2,522,600 A * 9/1950 Brookins ................. 239/193
2,590,779 A * 3/1952 Lehmann .................. 239/43
2,681,609 A * 6/1954 Drager ..................... 454/291
3,265,371 A * 8/1966 McGrath .................. 261/27
3,322,405 A * 5/1967 Knudson et al. .......... 261/27
3,427,005 A * 2/1969 Kuykendall ............... 261/26
3,686,830 A * 8/1972 Huntington ............... 96/296
4,351,781 A * 9/1982 Blatter ..................... 261/29
4,933,117 A * 6/1990 Wilson ..................... 261/99
5,130,063 A 7/1992 Collins et al.
5,431,858 A * 7/1995 Harrison, Jr. .............. 261/5
5,971,370 A 10/1999 Galabinski
6,367,277 B1 * 4/2002 Kinkel ..................... 62/310
2003/0001294 A1 * 1/2003 Permenter ................. 261/97

FOREIGN PATENT DOCUMENTS

WO      WO 99/36739 A1      7/1999

* cited by examiner

*Primary Examiner*—Scott Bushey
(74) *Attorney, Agent, or Firm*—Foley & Lardner LLP

(57) ABSTRACT

A water distribution system for wetting an evaporative media pad includes a nozzle spraying a stream of water onto a water distributor that diverts the stream into at least two different portions. A plurality of fingers extend in at least two different directions to direct the two portions onto different locations of the media pad.

16 Claims, 10 Drawing Sheets

EVAPORATIVE COOLER WATER DISTRIBUTION SYSTEM

CROSS-REFERENCE TO RELATED PATENT APPLICATIONS

This application is being filed concurrently with U.S. patent application Ser. No. 10/612,323, entitled Low Profile Evaporative Cooler Housing; and U.S. patent application Ser. No. 10/612,623, entitled Evaporative Cooler Media Housing; and U.S. patent application Ser. No. 10/612,622, entitled Low Profile Evaporative Cooler. Each of the foregoing applications is incorporated herein by reference.

BACKGROUND OF THE INVENTION

The present invention relates generally to the field of evaporative coolers, and more particularly to a water distribution system for an evaporative cooler.

Evaporative coolers are well know and used in warm dry climates to both raise the humidity and cool the air. Evaporative coolers work by drawing air from outside through a media soaked with water. As the air flows through the soaked media water is evaporated by the outside air thereby lowering the temperature of the air. The cooled air is then directed into the area to be cooled.

An evaporative cooler includes a number of elements all of which are stored in a housing. These elements typically include an air blower; a media pad; a water distribution system; and an electric motor. Evaporative coolers need to be maintained on a periodic basis to replace the media pads and to clean the water distribution system.

There are three traditional approaches to mounting evaporative coolers. One approach is to mount the cooler on the roof in which the cooled air is blown down into the building. This type of cooler is also referred to as a down-draft cooler. The roof mounted cooler provides the advantage of being out of the way and can be easily connected to a duct system to deliver the cooled air. However, maintenance of the roof-mounted coolers is difficult due to access. Additionally, many roof mounted coolers are being banned under local zoning ordinances due to the aesthetic nature of the cooler located on the roof.

Another method of locating evaporative coolers is by hanging the housing from a window or eve. The cooled air is then blown into the area to be cooled through the side of the cooler and is also referred to as a side-draft cooler. The window or eve hung coolers while being more accessible are typically hung from the eves or proximate a window. This approach has a number of disadvantages including blocking the window from use by the cooler. Additionally, the width of the coolers or the distance from which they extend from the building can be up to three feet or more. This extension from the home may not be aesthetically pleasing and also takes up a portion of the yard. Where the coolers are located in more densely populated areas with housing units close to one another the three feet extension may take up a significant portion of the space between the buildings. In addition to making use of the space between the building more difficult to use for garbage and recycling containers, it may make maintenance of the unit more difficult.

A third method of mounting the coolers is to place them on the ground in which the cooled air is blown upwardly. This type of cooler is also referred to as an updraft cooler. This type of cooler has the disadvantage of requiring even greater yard space than the down-draft and side-draft coolers.

Accordingly, it would be desirable to provide an evaporative cooler that could be mounted to a building that would be easy to maintain in small tight areas between buildings. Additionally, it would be desirable to provide an evaporative cooler housing that was not mounted to a roof to avoid local zoning prohibitions. Further it would be desirable to provide an evaporative cooler housing that did not excessively protrude into the yard from the building. Still further it would be desirable to provide a water distribution system that was efficient, compact and required minimal maintenance. It would also be desirable to provide a low profile evaporative cooler that includes centrifugal blowers that provide increased efficiency of the cooler.

SUMMARY OF THE INVENTION

One embodiment relates to a water distribution system for wetting an evaporative media pad having an air inlet side, an opposing air outlet side, a pair of sides extending between the air inlet side and air outlet side, and a top. The system includes a nozzle configured to spray a stream of water upwardly. A water distributor is located above the top of the media pad and has a substantially horizontal receiving surface configured to split the water stream into a first portion directed toward the air inlet and a second portion directed away from the air inlet.

In another embodiment, a water distribution system is disclosed for wetting an evaporative media pad having an air inlet side, an opposing air outlet side, a pair of sides extending between the air inlet side and air outlet side, and a top. The system includes a nozzle configured to spray a stream of water against a water distributor having a plurality of fingers to direct the stream of water therealong. The fingers include a first set of fingers that direct a portion of the stream of water in a first direction toward a first location on the top of the media pad. A second set of fingers direct a second portion of the stream of water toward a second location on the top of the media pad.

In still another embodiment, a water distribution system for wetting an evaporative media pad in an evaporative cooler includes a nozzle configured to spray a stream of water against a water distributor having a plurality of fingers to direct the stream of water therealong. The plurality of fingers are separated by one of a channel and a slit and are directed downwardly. The plurality of fingers include at least two fingers directing a portion of the stream of water to at least two different locations respectively.

DETAILED DESCRIPTION OF THE PREFERRED EMBODIMENTS

Figure 1:
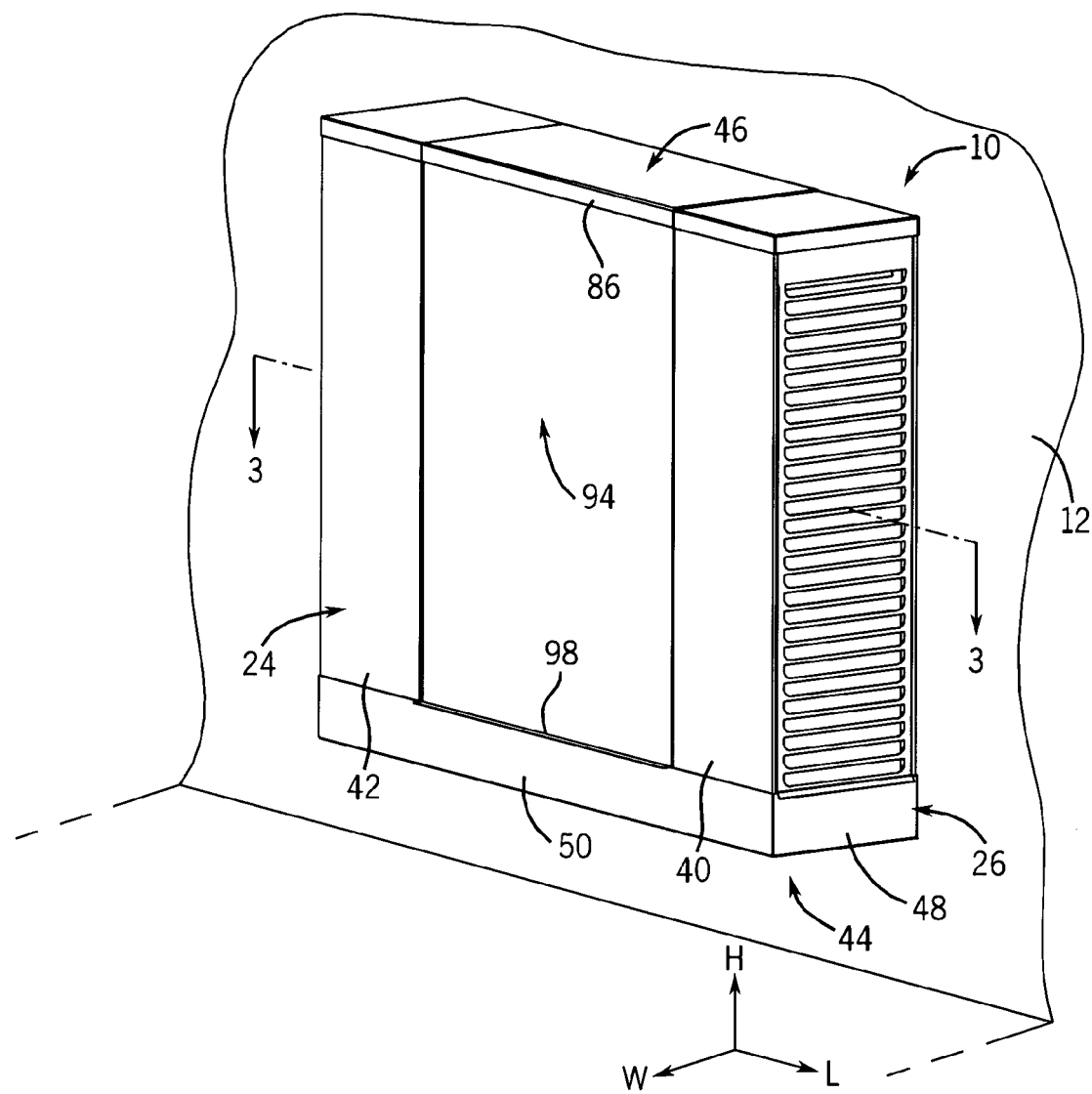
FIG. 1 is a perspective view of a low profile evaporative cooler.

Referring to FIG. 1, an evaporative cooler 10 is attached to a building or structure 12. Evaporative cooler 10 includes an evaporative cooler housing 14, a media assembly 16, a blower assembly 18, and a water distribution system 20. For purposes of convenience, the rear side 22 of evaporative cooler housing 14 will be the side that is in contact with building 12. Accordingly, front side 24 of the evaporative cooler faces away from the building. The right side 26 and left side 28 of evaporative cooler 10 is on the right and left, respectively as viewed from an observer facing front side 24. Further, the term "width" as used herein shall refer to the dimension that is perpendicular to the wall of the building 12. The term "height" shall refer to the up/down dimension, and the term "length" shall refer to the dimension that is both perpendicular to the height and width (see FIG. 1).

Figure 2:
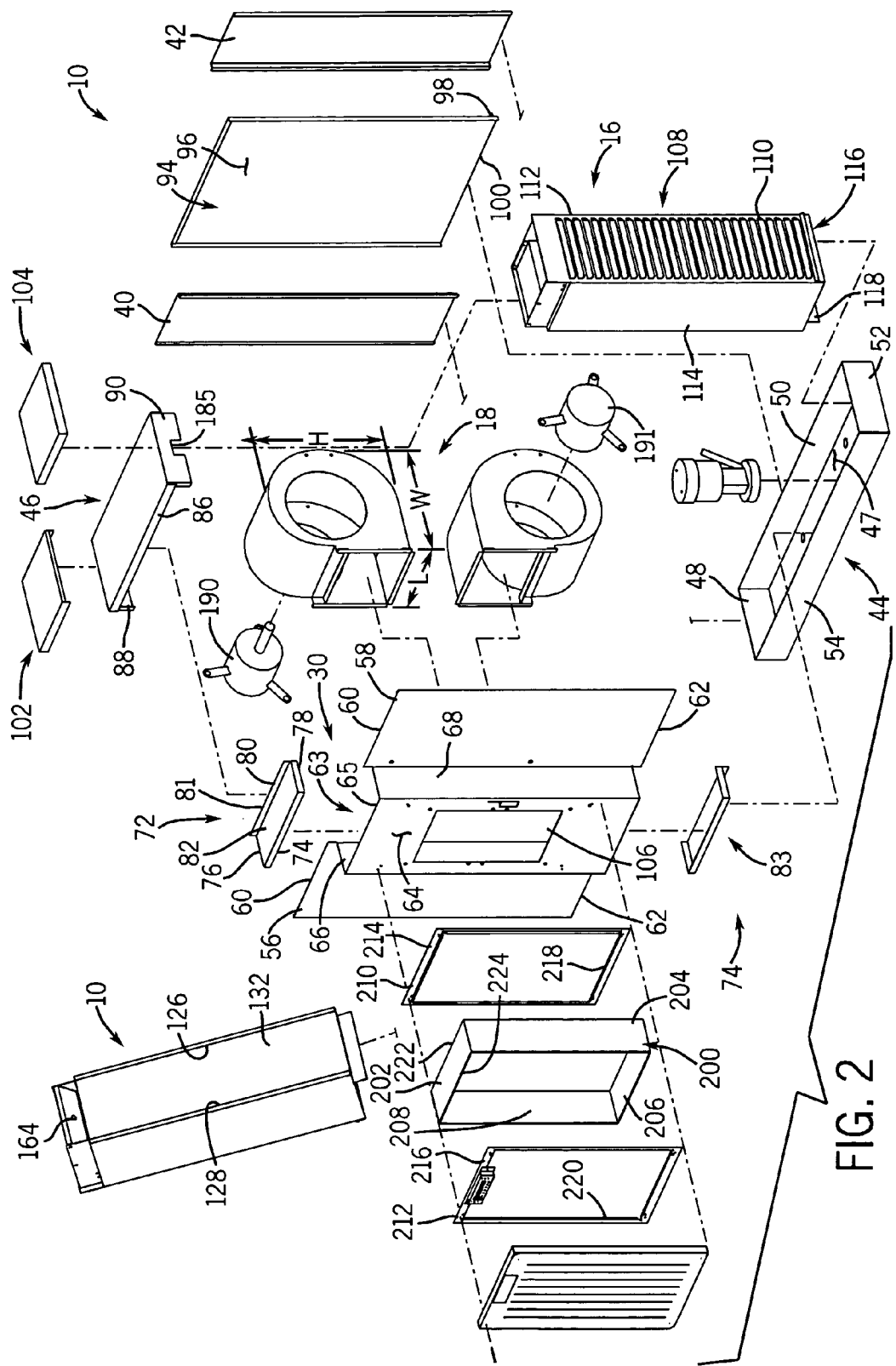
FIG. 2 is an exploded view of an evaporative cooler.

In the preferred embodiment, evaporate cooler housing 14 is formed from a rear panel 30, a pair of right and left front panels 40, 42, a base 44, and a top panel 46. Referring to FIG. 2. base 44 includes a base plate 47 and four upstanding flanges extending therefrom 48, 50, 52, and 54 to form a water retention cavity or basin. Right and left front panels 40, 42, are attached to the front upwards extending flange 50 of base 44. Rear panel 30 includes right and left panels 56, 58 having a collinear upper edge 60 and a collinear lower edge 62. Extending from panels 56 and 58 is a rearwardly extending portion 63 having a panel 64 offset a predetermined distance from panels 56 and 58 by flanges 66 and 68 respectively. The top edge 65 of panel 64 and flanges 66 and 68 is a predetermined distance below the upper edge 60 of portion 63. Similarly, a bottom edge 69 of panels 64 and flanges 66 and 68 is a predetermined distance above the lower edge 62 of panels 56 and 58.

Figure 3:
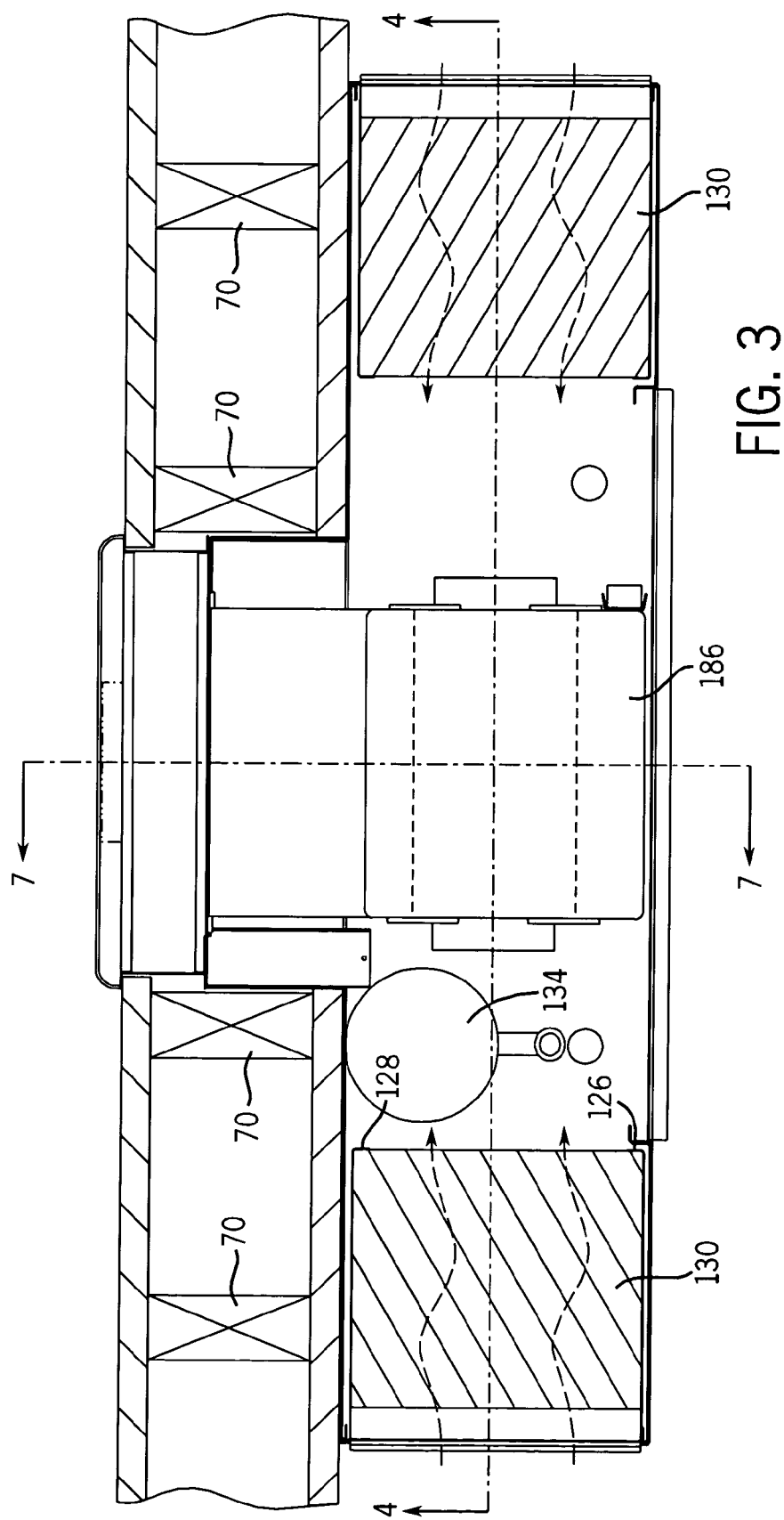
FIG. 3 is a cross-sectional view of the evaporative cooler taken generally along lines 3—3 of FIG. 1.
Figure 8:
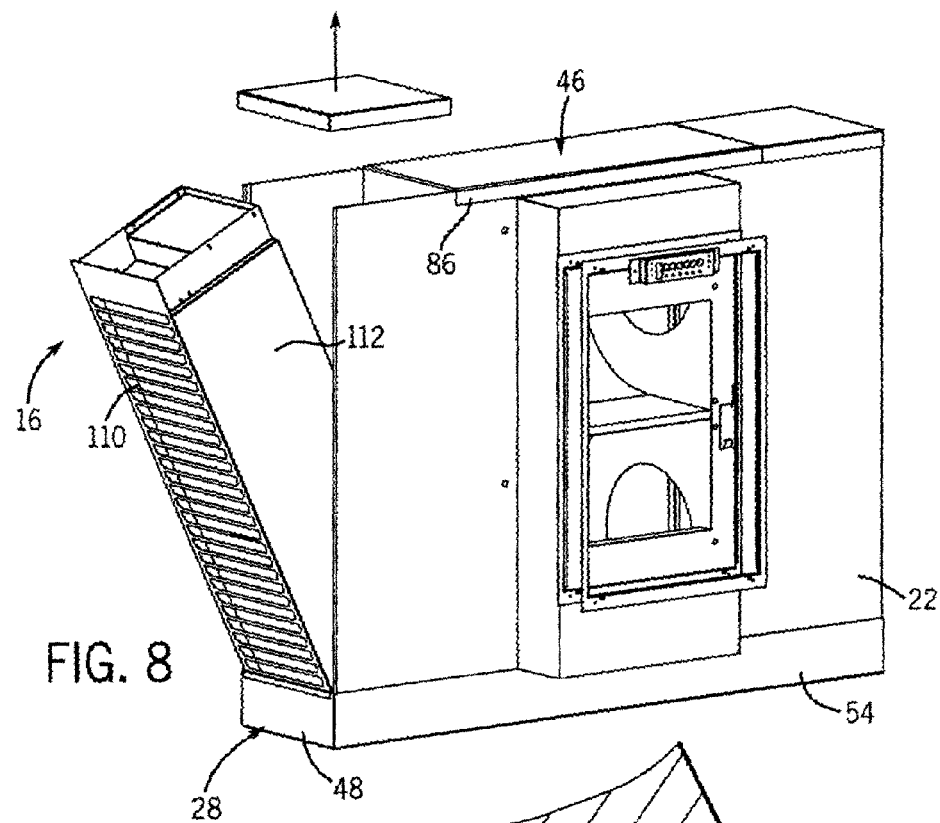
FIG. 8 is a perspective view of the evaporative cooler with a media cabinet tilted outward.

The lower portion of panels 56 and 58 is attached to upwardly extending flange 54 of base 44. Rear panel 30 is formed from a single piece of sheet metal bent to form the various panels 56, 66, 64, 68, and 58. It is also possible to form rear panel from two or more pieces of material. For example panels 64, 66 and 68 could be formed from one or more components and attached or welded to panels 56 and 58. However, this construction increases the chance of leaking or corrosion at the joints where the full effect of protective coating may be disrupted. The inwardly extending region 63 defined by panel 64, and flanges 66, and 68 is configured to fit between two standard spaced studs 70 of building 12 (see FIG. 3). The standard spaced studs include 16 inch on center. Of course in other standards are also contemplated. The benefit of providing spacing that can be used with standard spaced studs, allows the evaporative cooler to be installed on new construction or existing buildings without the need to modify the stud configuration. Rear panel 30 further includes an upper cap member 72 having a downwardly extending rear flange 74 and a right and left downwardly extending flanges 76, 78. Additionally, upper cap member 72 has an upwardly extending flange 80. All of the flanges 74, 76, 78, and 80 extend from a center plate member 82. Downwardly extending flanges 74, 76, and 78 are secured to panels 64, 66 and 68 respectively. The upper edge 81 of flange 80 is collinear with upper edge 60 of panels 56 and 58 when the upper cap 72 is in the assembled position (see FIG. 8). Similarly, a lower cap 83 is secured to the lower portion of rear panel 30. Referring to FIGS. 1, 2, and 8, top panel 46 includes a downwardly extending front and rear flange 84, 86 and a downwardly extending right and left flange 88, 90. Downwardly extending front flange 84 is secured to right and left front panels 40, 42 and downwardly extending rear flange 86 of top panel 46 is secured to panels 56, 58 of rear panel 30 as well as to upwardly extending flange 80 of upper cap 72.

A shell is formed from the base 44, top panel 46, rear panel 30 and upper and lower rear panel caps 72, 74, and front panels 40, 42. A front access door 94 includes a central panel area 96 and a frontwardly extending flange 98 located proximate bottom edge 100 of main panel portion 96. Additionally, a pair of moveable top covers 102, 104 cover the right and left media assemblies 108, respectively. The width of the sides 26, 28 of evaporator cooler housing 14 is determined by the width of upwardly extending flanges 48, 52 of base 44. In a preferred embodiment, the width of base 44 as defined by the distance extending outward from the building 12 is 9.5 inches.

Additionally, the width or distance that flanges 66 and 68 of rear panel 30 extend into the building between studs 70 is 14 inches. It should be noted that in the preferred embodiment, flanges 66 and 68 are integrally formed and part of rear panel 30 and extend substantially perpendicular to panels 56 and 58. This provides the offset of panel 64 relative to panels 56 and 58. Panels 64 includes an opening 106 which serves as the air outlet to the evaporate cooler housing 14. It should also be noted that the front side 24 of housing 14 does not include any louvered openings. However, it is possible in an alternative embodiment to provide louvered openings alone or in any combination with of panels 40, 42, and 94. The air inlets of evaporator housing 14 is accomplished through the right and left media assemblies 16 that are located on the right and left sides 26, 28 of the housing 14. Since the right and left media assemblies are identical to one another, each similar component will be identified with a single reference number.

Figure 9:
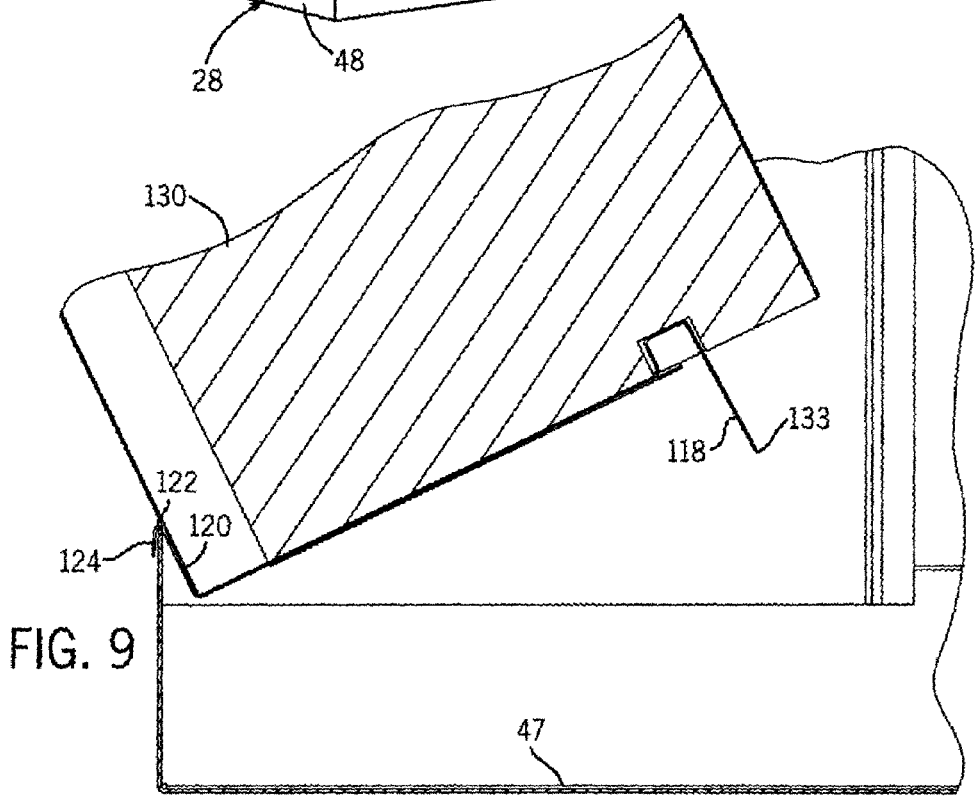
FIG. 9 is a partial cross sectional view of the media cabinet and media tilted outward.
Figure 10:
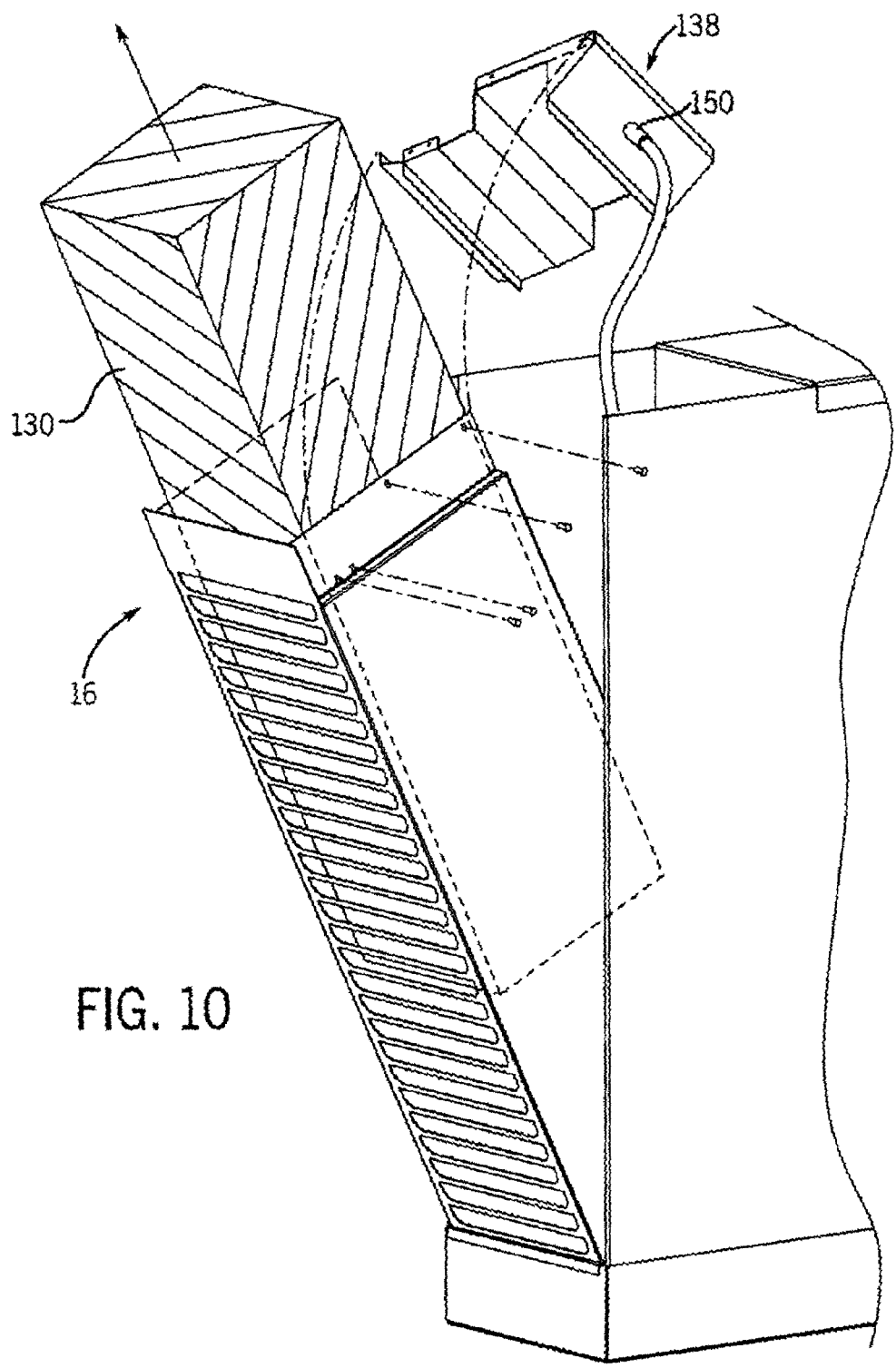
FIG. 10 is a partial cross sectional view of the media cabinet with the media partially removed.

Turning now to FIGS. 2, 8 and 9, the media assembly 16 will be described in further detail. Media assembly 16 includes a housing 108 that includes a side louver 110, a front panel 112, a rear panel 114, and a base panel 116. Extending from base panel 116 is support or leg 118. Also extending from base panel 116 is an upwardly extending flange 120 having a upwardly extending ledge 122 with a downwardly extending catch flange 124. Each of the front and rear panels 112, 114 include a flange 126, 128, respectively that extends inwardly into the cavity of the cooler housing 14 a predetermined distance. A media pad 130 is located within the cavity 132 formed by the side louver 110, front panel 112 and rear panel 114, and inwardly extending flanges 126, 128. In a preferred embodiment media 130 is a rigid media having a width of nine (9) inches, a height of twenty nine (29) inches and a length of eight (8) inches. Each media assembly housing 108 is pivotally attached to upwardly extending base flanges 48, 52 respectfully as illustrated in FIGS. 8 and 9. Rigid media as used herein means media formed from corrugated sheets of material that are bonded together to form a rigid structure. Typically the angle of the corrugated flutes are different for adjacent corrugated sheets. An example of rigid media is that sold by Munters under the trade name Celdek. Rigid media also has the characteristic of being substantially rigid.

When the media housing 108 is in an in use position, a bottom edge 133 of leg 118 rests on the inner surface of base plate 47 of base 44. Media assembly 16 is pivoted from a substantially vertical position to an angled position as shown in FIG. 8 or to a fully horizontal position (not shown) to permit easy access to remove and replace media pad 130.

Figure 4:
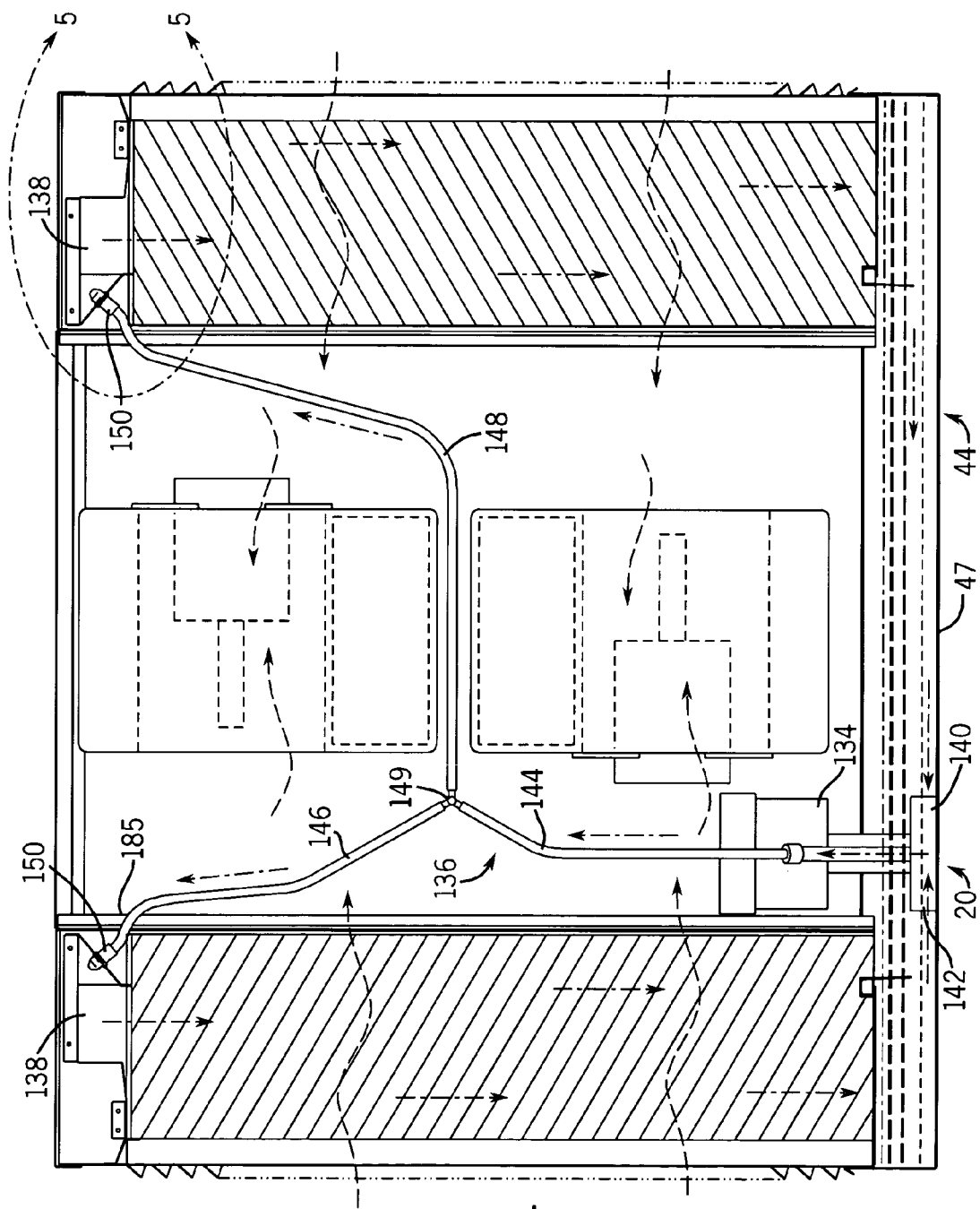
FIG. 4 is a cross-sectional view of the evaporative cooler taken generally along lines 4—4 of FIG. 3.

Referring to FIG. 4, water distribution system 20 includes a pump 134, a water distribution line 136, and a water diffuser 138. Pump 134 includes a base 140 having on inlet 142. Base 140 rests upon plate 47 of base 44. Water is pumped from base 44 into water distribution lines 136 through a first line 144. Line 144 splits into two lines 146, 148 via a splitter 149. Each of lines 146, 148 terminate with a nozzle 150, that is secured to water diffuser 138.

Figure 6:
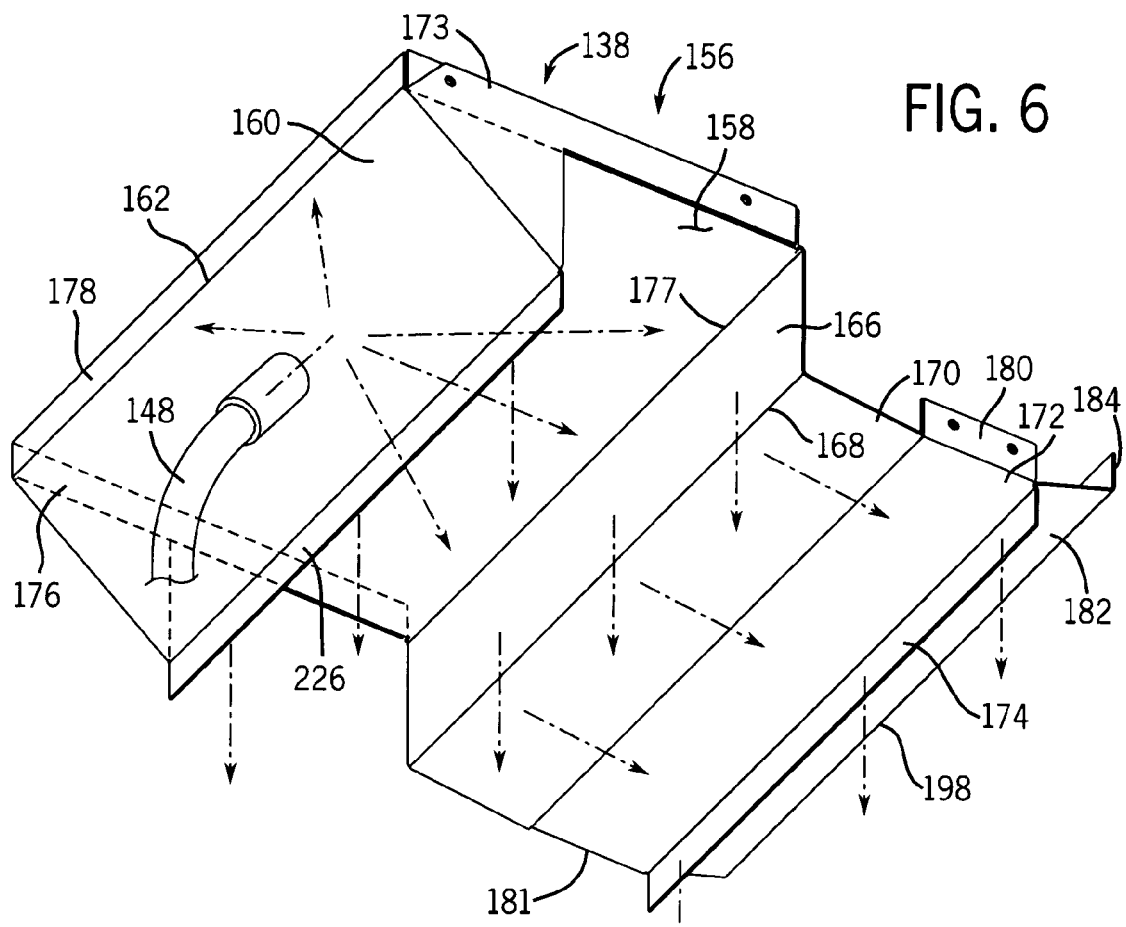
FIG. 6 is a perspective view of the water distribution system of the evaporative cooler.
Figure 5:
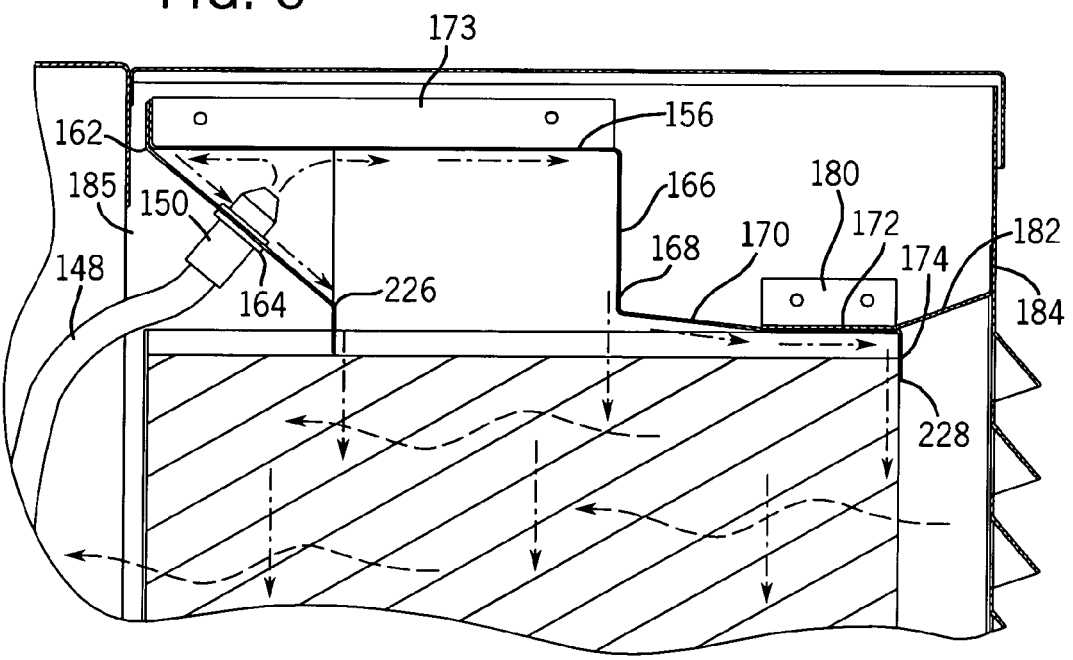
FIG. 5 is a close up view of the cross-sectional view of FIG. 4 taken along lines 5—5 of FIG. 4.

Water diffuser 138 is illustrated in FIGS. 5 and 6 and positioned as it would be if installed on the right side 26 of evaporative cooler 10. Water diffuser 138 includes a top panel 156 having a bottom surface 158 that faces downward. A nozzle support plate 160 extends from a front edge 162 of upper plate 156. Angle support plate 160 extends downward and away from edge 162. Referring to FIG. 5, the angle between the support plate 160 and top plate 156 is forty degrees. However, the angle could be between twenty and sixty degrees or any other angle sufficient to direct water from upper plate 156 to a desired location on media 130. Nozzle 150 is releasably attached to support plate 160 through an opening 164 that is centrally located on support plate 160. (See FIG. 5.) Water diffuser 138 further includes a first vertical plate 166 extending downwardly from top plate 156 and substantially perpendicular to top plate 156. Extending from a lower edge 168 of first vertical plate 166 is a plate 170 that forms an angle of 100 degrees with vertical plate 166. However, any angle may sufficient so long as it permits a portion of the water to be translated from plate 166 to plate 172. Plate 170 transitions into a horizontal plate 172 that is substantially parallel to top plate 156. A downwardly extending flange 174 extends from an edge of horizontal plate 172. Extending upward from top plate 156 is a first flange 175, a second flange 176 and a side flange 178. Additionally extending upwardly from plate 172 is a first flange 180 and a second flange 181.

The water diffuser 138 that is placed on the right side of evaporative cooler 10 is secured to the front and rear walls 112, 118 through attaching flanges 173 and 180, and 176 and 181, respectively.

Referring to FIG. 5, water diffuser 138 includes a first water distribution edge 226 that extends from the angled support plate 160, a second water distribution edge 168 extends from the lower edge of plate 166, and a third water distribution edge 228 extending from flange 174. Water diffuser 138 also includes an upwardly extending panel 182 terminating in an upwardly extending flange 184. Upwardly extending flange 184 abuts against the side panel 110.

As illustrated in FIG. 4, line section 148 extends from the splitter to the nozzle 150. The line 148 extends through an opening 185 in flanges 88 and 90 of top panel 46. Water is pumped from a water basin defined by base 44 through water distribution lines 136 to the two nozzles 150 located on the respective right and left water diffusers 138.

Water is sprayed through each nozzle 150 such that it sprays the water against surface 158 of the top plate 156. Nozzle 150 has an outlet that 0.360 inches in diameter. The size of the nozzle outlet is sufficient to minimize cleaning required due to mineral buildup. Additionally, a single nozzle may be used to wet a rigid media 130 having a length of eight inches and a depth of nine inches. As illustrated in FIGS. 5 and 6 the water hitting surface 158 is split between a first direction toward plate 166 and a second direction toward plate 160. The water forms a semi-circular pattern such that as the water reaches edges 177 and 178 of plate 156, the entire edges are covered with water.

The portion of the water flow that hits edge 162 is then directed downward along plate 160 to a lower edge 226 and is deposited onto media 130 at a first position.

The portion of the water flow that hits edge 177 is directed downward along plate 166 to edge 168. At lower edge 168 the water flow is split. A portion of the water will be deposited onto media 130 at a second position. The remaining water wraps around lower edge 168 and flows along plate 170 and 172 and is finally directed into a third portion of media 130 at flange 174.

Figure 11:
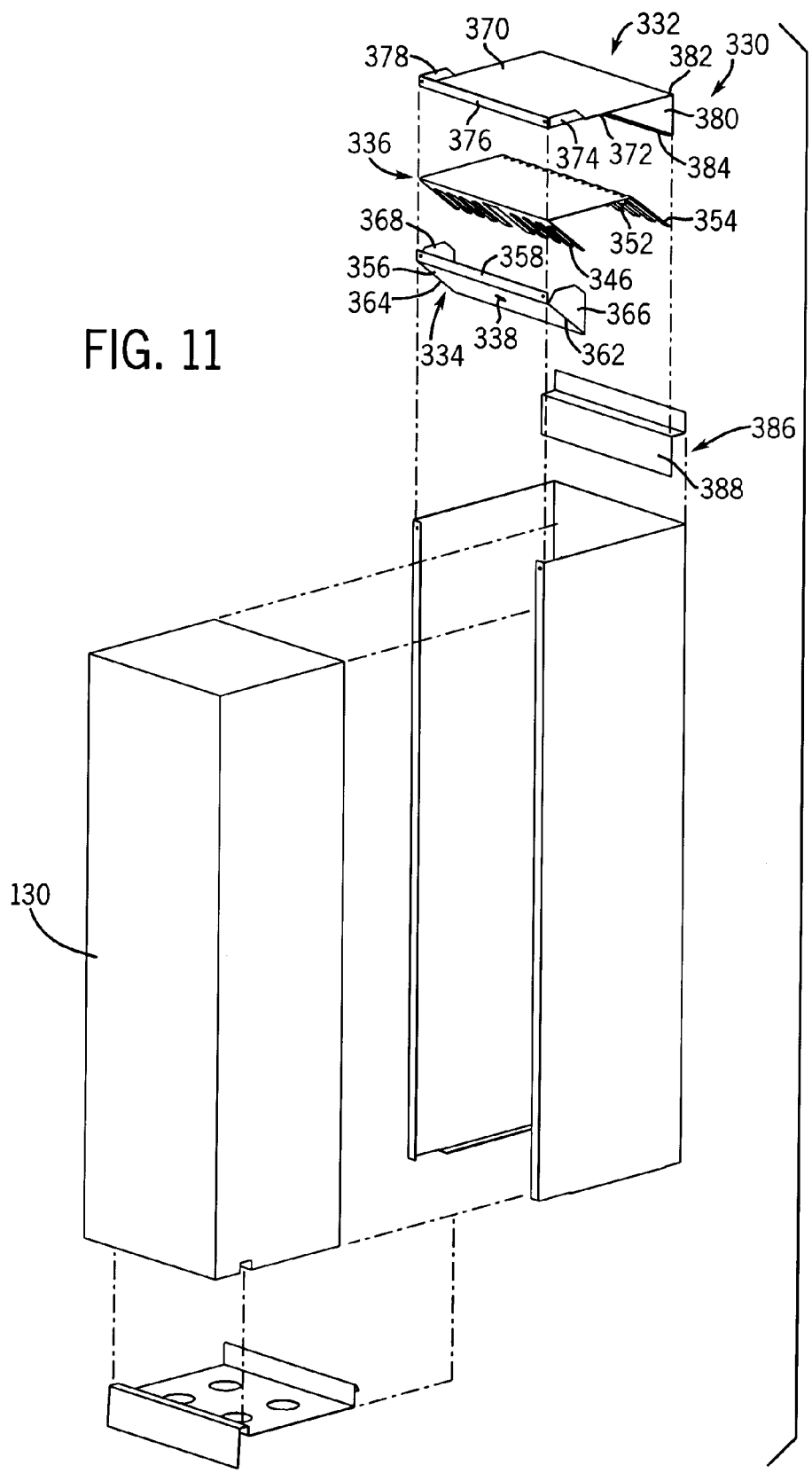
FIG. 11 is an exploded view of an alternative water distribution system.
Figure 13:
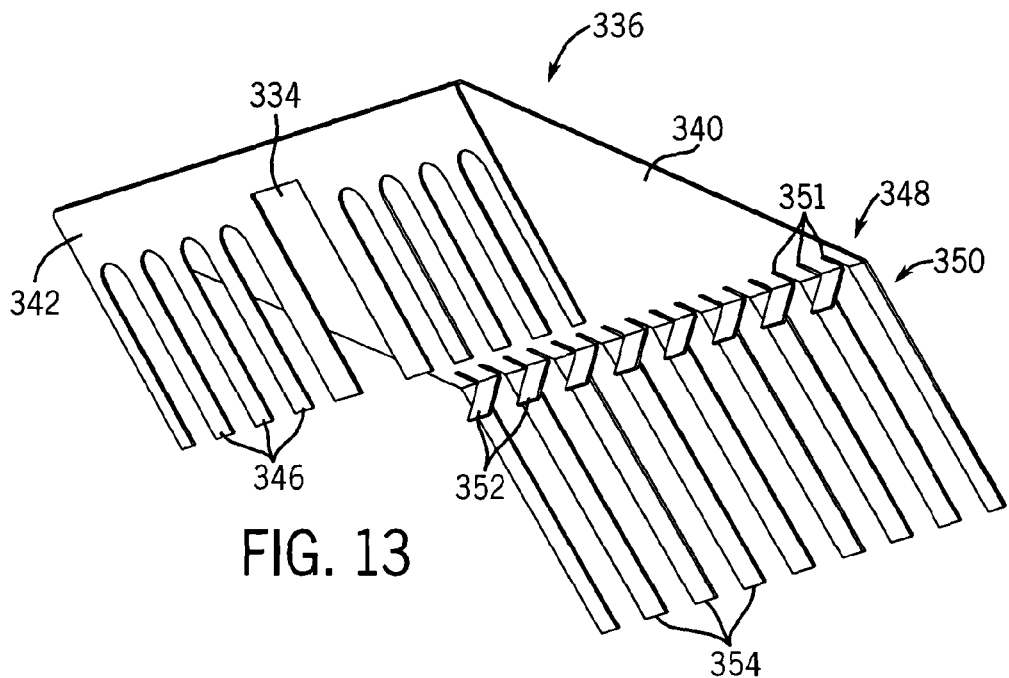
FIG. 13 is a perspective view of the finger plate the water distributor of FIG. 11.
Figure 12:
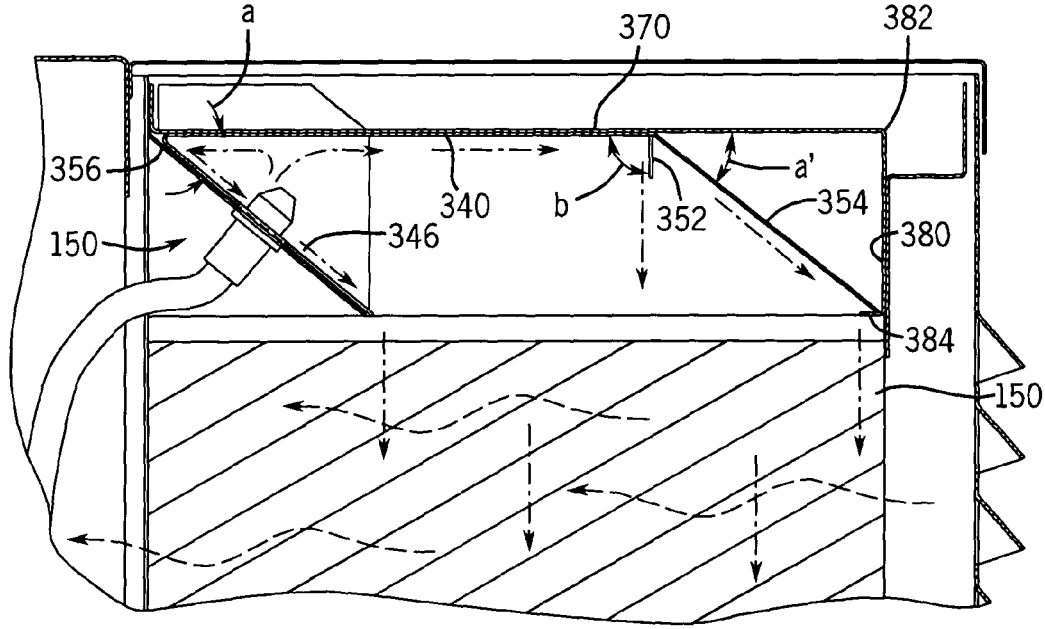
FIG. 12 is a cross-sectional view of the water distributor of FIG. 11.

Referring to FIGS. 11–13 another water diffuser 330 is formed from three components, a top panel 332, an angled panel 334 and a finger insert 336. The finger insert 336 provides a plurality of channels through which water is routed to ensure that the water flow does not concentrate in a particular region of the diffuser, but rather the water is spread across the entire width of the diffuser 330. The water diffuser 330 illustrated in FIGS. 11–13 is shown as the right side diffuser. However, a similar mirror image water diffuser may be employed on the left side of the evaporative cooler 10. Nozzle 150 is secured to angled panel 334 through an opening 338. Water is sprayed from nozzle 150 such that it hits a substantially horizontal portion 340 of finger insert 336 in such a manner that it directs a portion of the water to the right and a portion of water to the left. In one embodiment, the amount of water directed to the right may be greater than the amount of water directed to the left back toward angled plate 334. Finger insert 336 includes a top portion 340 that may be substantially horizontal and is attached to the top panel 332. Extending from a left edge of the top portion 340 is a first fingers plate 342 extending downward and to the right at the same angle as the angled panel 334. The finger plate 342 includes a cut out region 344 that is aligned with nozzle 150, and a plurality of fingers 346 that are spaced apart from one another.

Extending from the right side of horizontal top portion 340 is a second set of angled fingers 348 that extends rightward and downward at an angle "a" of forty (40) degrees. In another embodiment, angle "a" is between 20 degrees and sixty degrees. However, the angle may be another value as long as it is sufficient to direct water to the desired location of the top of media 130. The second set of angled fingers 348 include includes a plurality of fingers 350 that are formed in part in the top portion 340. A plurality of slits 351 are made in top portion 340 proximate the right edge of the top portion 340 to separate the fingers. The second set of angled fingers 348 include a first group of fingers 352 that extend downwardly at an angle of ninety (90) degrees relative to top portion 340, while a second group of fingers 354 extend downward and to the right or outward at an angle (a') of forty (40) degrees. In another embodiment angle a' could be between 20 degrees and 60 degrees or any other angle sufficient to provide water to be directed toward media 130.

Angled plate 334 includes a support plate 356 having opening 338 as noted above. Extending from a top edge of support plate 356 is an upwardly extending flange 358, and extending from a bottom edge of support plate 356 may be a downwardly extending flange (not shown). Also extending from each of the front and rear edges 362, 364 of support plate 356 is a flange plate 366, 368 extending upward and to the right that is attached to top plate 332.

Top plate 332 includes a horizontal plate 370 having a bottom surface 372 and three flanges 374, 376, 378 extending upwardly. Top plate 332 further includes a plate 380 extending from the edge 382 distal the angled plate in downward direction. Extending from the bottom edge of plate 382 is a flange 384 extending to the left.

A support bracket 386 is located adjacent plate 380 and has a plate 388 extending below flange 384 that may be in contact with media 130 (See FIG. 12). The free ends of fingers 354, 352, and 346 are disposed proximate the top of media 130 such that they are spaced apart from one another and spaced along the length of the media 130. The ends of fingers 354 are proximate the outer or right side of the media 130, while the ends of fingers 346 are located a predetermined distance from the left or inner side of media 130. The ends of fingers 352 are located intermediate the ends of fingers 354 and 346.

Figure 7:
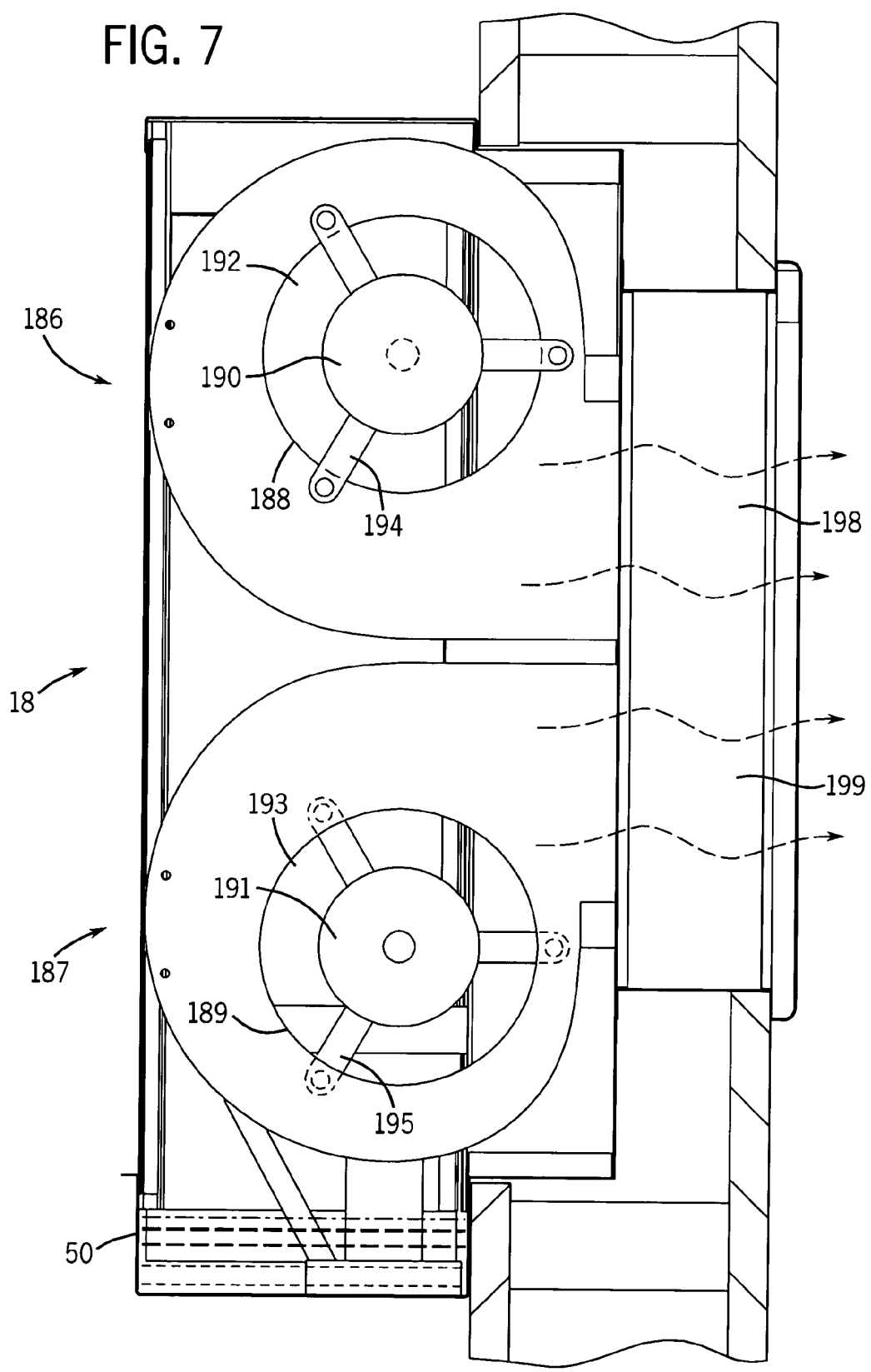
FIG. 7 is a cross-sectional view taken along lines 7—7 of FIG. 3.

Turning to FIG. 7, the blower assembly includes an upper or first blower 186 and a lower or second blower 187. In a preferred embodiment, the blowers are inverted relative to one another. The upper blower 186 includes an impeller 188 that is driven by a motor 190. Air is drawn thought the side inlet 192 and blown out through the outlet 194. Upper blower 186 is positioned within cavity 132 of evaporative cooler housing 14 such that the exhaust is located on the bottom of the blower 186. The width of the blowers 186, 187 as measured along a vector perpendicular to the rear panel is greater than the distance between the rear panels 56, 58 and front panels 40, 42. The blower 186 extends into the extended portion 63 allowing the blowers to be partially located within the wall of the building upon which the cooler is attached.

The lower blower 187 is inverted relative to the upper blower 186, such that the exhaust outlet 198 is located on the top portion of the blower 187. The inversion of the lower blower 187 allows the overall width of the housing to be minimal and also minimizes the length of the outlet. Each of the upper and lower blowers 186, 187 includes a direct drive motor 190, 191 that is mounted with three ears 194, 195. Of course other types of motors or mounting devices may be employed. In the preferred embodiment, each blower is rotary type blower having a height H of 14.75 inches; a width W of 12.75 inches, and a length L of 9.560 inches.

In a preferred embodiment, each of blowers 186, 187 are rotary blowers having a ⅛ hp motor and a nine inch diameter blower wheel. The inversion of the blowers relative to each other permits an equal flow of air through the right and left sides of the evaporative cooler. Additionally, the position of the blowers permits the air entering the media 130 to head directly into the blower without having to turn ninety degrees. Of course air entering either the top or bottom of the media will enter the blower at an angle. However, greater efficiency is achieved since the inlet or openings of the blowers face the right and left sides of the evaporative cooler and media 130. The inverted blowers allows double the air flow while still maintaining a nine inch blower wheel. To double the air flow with a single blower, the diameter of blower wheel may have to be increased. An increased blower wheel diameter would require a larger blower housing which in turn would require a large evaporative cooler housing. A larger housing would project further from the building structure. Typically the length of the blower wheel as measured along a longitudinal axis about which the blower rotates is the same as the diameter of the blower wheel. Other types of devices to draw air that may be used in connection with the concepts disclosed herein include a standard propeller type fan blade, a mixed flow slower wheel, and other devices known in the art.

Turning to FIG. 2 evaporative cooler 10 includes an extension 200 that extends between extension panel 64 of rear panel 30 through the wall of the building 12. Extension 200 is formed of a rigid preformed plastic sheet that has four sides, 202, 204, 206 and 208. The extension is movable from a flattened position in which sides 202 and 204 are adjacent sides 206 and 208 to a rectangular position that has the same periphery as the opening 106 of extension panel 64. Other types of extensions are also contemplated such as an accordion style member or an extension formed from two separate components that slide relative to one another. The ability to easily adjust the width of the extension permits the grill to fit adjacent the inner wall of the building while allowing the rear panel of the housing to be adjacent the outer wall of the building. In one embodiment the rear panel extension portion has a width of 4.2 inches. This width is sufficient to house a portion of the blower and to be affixed if desired to the studs, but does not extend beyond the width of the wall (the distance between the inner and outer walls of the building or structure). While 4.2 inches is the width of the extension in one embodiment, other widths may be employed.

A first and second frame member 210, 212 are positioned on either side of the extension 200. Each frame member 210, 212 includes an outer frame member 214, 216 and an inwardly extending flange 218, 220. Each end 222, 224 of extension 200 fits about the inwardly extending flanges 218, 220 respectively. Extension 200 may be secured to the inwardly extending flanges 218, 220 with a mechanical or adhesive fastener. The inner frame member 214 is attached directly to the rear panel 30 with mechanical fasteners or other fastening means. The second frame member 216 may be attached to the inside wall of building 12. Extension 200 may be sized to extend from the first frame member 214 through the wall to the second frame that is located proximate the inside wall of the building. Finally a grill is secured to the second frame member 216 to provide both a decorative finish to the evaporative cooler and provide means for directing the air flow into the building.

In one embodiment, the width of the housing as measured from the building structure that the rear panel contacts is 9.5 inches. The length of the housing is 42 inches. This represents a length to width radio of over 4. The extension portion of rear panel extends 4.5 inches into the building as measured from the outside wall of the building. Accordingly, in one embodiment, the total width available for housing the blower is 14 inches. The extension of 4.5 inches into the wall of the building ensures that the extension will not significantly protrude into the building structure when the building structure utilizes standard 2×4 construction with minimal thickness outer wall and inner wall materials. Most evaporative coolers utilizing a centrifugal blower having a blower wheel typically have a width to length ratio of 1. Low profile coolers typically have a ratio of between 1.5 and 2.0. However, the lower profile coolers with a width under 24 inches are limited by the size of the blower and therefore the amount of air can be cooled by the cooler as measured in cubic feet per minute is limited. The use of side air entry allows the blowers to extend up to the front wall further minimizing the area required to store the blowers and thereby allowing for a bigger blower wheel then if a media pad was placed proximate the front panel. Additionally, the two side rigid media 130 can be eight inches in length to provide increased efficiency over a thin media pad of aspen wood or other thin media. Efficiency in the low profile evaporative cooler is gained by providing dual side air inlets through media pads that does not require the air to turn ninety degrees to enter to the centrifugal blowers. Additionally, efficiency in the low profile evaporative cooler is gained by providing two blowers and allowing both sides of the blowers to receive air from the right and left side inlets. The size of the blowers that can be used is further restricted for a low profile evaporative cooler if the blowers are to be located in part in the wall between two 16 inch on center studs. By locating the blowers one on top of the other in an inverted fashion, the blower outlet can be upto 14 inches in length and still have the inlets directly face the side inlets. The low profile evaporative cooler is further enhanced by locating the motors to run the blowers proximate the inlets to allow the height of the evaporative cooler housing to minimized. Alternatively the motors may be located between the inlets on the right and/or left sides of the blowers. If the motors are placed between the blowers and the front and or rear walls the width of the housing must increase. Similarly, if the motors are placed above or below the blowers, the height of the housing must increase. By employing two centrifugal blowers as described above, it is possible to achieve an actual cooled airflow of over 1200 cfm with a housing width of under 15 inches. In one embodiment the housing extends under 10 inches from the outer building structure wall. Further, the combined cooled airflow achieved with a housing extending 10 inches or less from the outer building structure may be over 1700, 1750, or 1800 cfm or greater.

It is important to note that the construction and arrangement of the elements of the evaporative cooler housing as shown in the preferred and other exemplary embodiments is illustrative only. Although only a few embodiments of the present invention have been described in detail in this disclosure, those skilled in the art who review this disclosure will readily appreciate that many modifications are possible (e.g. variations in sizes, dimensions, structures, shapes and proportions of the various elements, values of parameters, mounting arrangements, use of materials, orientations, etc.) without materially departing from the novel teachings and advantages of the subject matter recited in the claims. Accordingly, all such modifications are intended to be included within the scope of the present invention as defined in the appended claims. The order or sequence of any process or method steps may be varied or re-sequenced according to alternative embodiments. Other substitutions, modifications, changes and omissions may be made in the design, operating conditions and arrangement of the preferred and other exemplary embodiments without departing from the spirit of the present invention as expressed in the appended claims.

What is claimed is:

1. A water distribution system for wetting an evaporative media pad having an air inlet side, an opposing air outlet side, a pair of sides extending between the air inlet side and air outlet side, and a top, the system comprising:
    a nozzle configured to spray a stream of water upwardly;
    a water distributor located above the top of the media pad having a receiving surface including a plurality of fingers configured to split the stream of water into a first portion directed downward toward the media pad and a second portion directed farther from the nozzle than the first portion;
    the receiving surface extending from a point of contact a sufficient distance to allow the stream of water to extend substantially across an entire width of the receiving surface;
    wherein a width of the first and second portions of the stream of water is substantially equal to a width of the media pad as defined by the distance between the pair of sides of the media pad;
    wherein the nozzle directs the stream of water toward the receiving surface at a non-vertical angle; and
    a support plate comprising a first member extending from an end of the distributor closer to the air outlet side and extending downward and toward the air inlet side.

2. The system of claim 1, wherein a volume of the first portion of the stream of water is not equal to a volume of the second portion of the stream of water.

3. The system of claim 1, wherein the nozzle is supported by the support plate.

4. The system of claim 1, further including a second member extending downward from the distributor distal the support plate directing the second portion of the stream of water toward the media pad, wherein the second portion of the stream of water is directed closer to the air inlet side than the first portion of the stream of water.

5. The system of claim 4, further including a third member directing a portion of the second portion of the stream of water toward the media pad in a location different than the second member.

6. The system of claim 5 wherein the first member and second member each includes a plurality of channels extending substantially between the inlet and outlet sides of the media.

7. A water distribution system for wetting an evaporative media pad having an air inlet side, an opposing air outlet side, a pair of sides extending between the air inlet side and air outlet side, and a top, the system comprising:
    a nozzle configured to spray a stream of water against a water distributor having a plurality of fingers to direct the stream of water therealong;
    the fingers including a first set of fingers directing a portion of the stream of water in a first direction toward a first location on the top of the media pad and a second set of fingers directing a second portion of the stream of water toward a second location on the top of the media pad; and
    a third set of fingers to direct a third portion of water to a third location on the top of the media pad.

8. The system of claim 7, wherein the water distributor includes a substantially horizontal receiving surface located above the nozzle being configured to split the stream of water and direct the two different streams of water in opposite directions.

9. The system of claim 8, wherein the receiving surface has a first end and an opposing second end, and the first set of fingers extend proximate the first end of the receiving surface and directed downward and toward the second end of the receiving surface.

10. The system of claim 9, wherein the second set of fingers extend from the receiving surface proximate the second end of the receiving surface and directed downward toward the top of the media pad.

11. The system of claim 10, wherein the second set of fingers alternatively extend downward in two different directions thereby diverting the second portion of the stream of water to two different locations on the top of the media pad.

12. The system of claim 11, wherein the nozzle sprays the stream of water toward the receiving surface upwardly at a non-vertical angle.

13. The system of claim 12, wherein the non-vertical angle is between forty and sixty degrees relative to the receiving surface.

14. A water distribution system for wetting an evaporative media in an evaporative cooler comprising:
   an evaporative cooler housing;
   an evaporative media having an air inlet side proximate a first side of the evaporative cooler housing;
   a nozzle located within the housing and above the evaporative media, the nozzle being configured to spray a stream of water against a water distributor having a plurality of downwardly extending fingers splitting the water stream to direct a first portion of the water stream to a first part of a top of the evaporative media, a second portion of the water stream passing between the fingers and being directed alone a bottom side of a second member to a second portion of the evaporative media located farther away from the nozzle and air inlet side of the evaporative media than the first part of the top of the evaporative media.

15. The water distribution system of claim 14, wherein the second member extends from the fingers toward an air outlet side of the evaporative media.

16. The water distribution system of claim 15, wherein the second member includes a plurality of fingers.

* * * * *

UNITED STATES PATENT AND TRADEMARK OFFICE
CERTIFICATE OF CORRECTION

PATENT NO. : 7,100,906 B2 Page 1 of 1
APPLICATION NO. : 10/612322
DATED : September 5, 2006
INVENTOR(S) : John G. Kucera and Roger C. Palmer It is certified that error appears in the above-identified patent and that said Letters Patent is hereby corrected as shown below:

Column 12:
line 4, replace "alone" with --along--.

Signed and Sealed this

Thirtieth Day of January, 2007

JON W. DUDAS
*Director of the United States Patent and Trademark Office*